United States Patent Office 3,503,924
Patented Mar. 31, 1970

3,503,924
LESSENING EARLY DISCOLORATION OF POLY-
VINYL CHLORIDE RESINS WHEN HEATED AND
COMPOSITIONS THEREFOR
Mark W. Pollock, Teaneck, N.J., assignor to Argus Chemical Corporation, Brooklyn, N.Y., a corporation of Delaware
No Drawing. Continuation-in-part of application Ser. No. 417,513, Dec. 10, 1964, which is a continuation-in-part of application Ser. No. 336,887, Jan. 10, 1964. This application Dec. 7, 1967, Ser. No. 688,694
Int. Cl. C08f 45/58
U.S. Cl. 260—45.75                        16 Claims

ABSTRACT OF THE DISCLOSURE

There is provided a homogeneous liquid polyvinyl chloride resin stabilizer composition containing a diorganotin mercaptide and a minor amount of an alpha-mercapto acid; the alpha-mercapto acid serves to improve the appearance of the resin during the earlier stages of heating. There is also provided a polyvinyl chloride resin composition containing the above stabilizer composition.

---

This application is a continuation-in-part of application Ser. No. 417,513, filed Dec. 10, 1964, now U.S. Patent No. 3,398,114, which in turn is a continuation-in-part of application Ser. No. 336,887, filed Jan. 10, 1964, and now abandoned.

This invention relates to homogeneous liquid polyvinyl chloride resin stabilizer compositions containing a diorganotin mercaptide and a minor amount of an alpha mercapto acid and to polyvinyl chloride resin compositions containing these compounds and having as a result an improved resistance to development of early discoloration due to heating and to a process for improving the resistance to polyvinyl chloride resins to early discoloration when heated.

Organotin mercaptides are now recognized as being among the most effective stabilizers for inhibiting the degradation of polyvinyl chloride resins at the high temperatures, e.g. 350° F. or 375° F., to which they are subjected during working. Although these compounds have been successful in providing good stability for one hour or more at 350° F. to 375° F., many of these compounds impart or do not entirely prevent an early yellow discoloration to the resin, which is manifested before severe heat deterioration really sets in. This early discoloration has not been considered disadvantageous for many uses, and the efforts of most workers in this field have been directed towards minimizing the onset of the more serious heat deterioration, i.e. blackening, which sets in during long heating, as in certain continuous milling operations. However, because of this early discoloration and the accompanying haziness or cloudiness that may also appear, it has not been possible in all cases to obtain a substantially clear and colorless polyvinyl chloride resin composition.

Although early discoloration and any accompanying cloudiness are not nearly so intense as later discoloration and embrittlement arising from heat deterioration of the resin, it has been recognized that the early discoloration arising during the first fifteen to thirty minutes of heating affects a relatively greater proportion of the resin. This is because the average period of time during which a given amount of resin product remains in the processing equipment, even in a continuous process which includes recycling of portions of the worked product, is less than thirty minutes. Only a minor portion of the resin will be subjected to working temperatures for periods of up to one hour or longer. Hence, the preservation of a good color and clarity during the first thirty minutes of heating can be more difficult than the protection against degradation of the relatively small proportion of the resin by long term heat stabilizers, such as the organotin mercaptides.

Combinations of various types of additives with organotin compounds have been proposed to improve their heat stabilizing effectiveness, and to impart special effects. For example, U.S. Patent No. 2,914,506 to Mack et al., dated Nov. 24, 1959, suggests combinations of organotin thioglycolates with metallic and non-metallic stabilizers, including metal salts, epoxy compounds, phosphites and phenols. U.S. Patent No. 2,938,013 to Mack et al., dated May 24, 1960, discloses combinations of organotin half ester maleates with other organotin compounds, metal salts, phosphites and epoxy compounds. Lazcano British Patent No. 1,008,589, published Oct. 27, 1965, discloses combinations of organotin half ester maleates and thioglycolates with other metal salts, phenols, epoxy compounds, phosphites, and polyols. None of these combinations is effective both to minimize early discoloration and preserve clarity.

French Patent No. 1,440,654, délivré Apr. 25, 1966 (the corresponding U.S. application Ser. No. 417,513 of which this application is a continuation-in-part) describes combinations of an organotin moiety, a mercapto acid moiety, and an antioxidant. The organotin moiety can inter alia include organotin maleate half esters, and the antioxidants include phenols, thiodipropionates, mono- and polysulfides, phosphites, and aromatic amines.

Although the problem of minimizing early discoloration is of long standing, few have been able to suggest a solution for it.

U.S. Patent No. 2,997,454, patented Aug. 22, 1961, to Leistner, Hecker and Knoepke, has suggested the combination with heavy metal salts of a higher fatty acid and organic triphosphites or with such phosphites and polyvalent metal salts of hydrocarbon-substituted phenols, of an acid phosphorus compound having at least one acidic hydrogen atom. This type of compound is not useful with organotin compounds to minimize early discoloration.

British Patent No. 1,001,344, published Aug. 18, 1965, describes stabilizer compositions composed of (a) an organo metallic compound in which the metal atom is lithium, sodium, potassium, magnesium, calcium, zinc, strontium, cadmium, barium, aluminum, tin or lead, or a mixture of any two or three of such organic-metallic compounds, provided that the stabilizer does not solely comprise barium laurate or cadmium laurate or dibasic lead phthalate, nor contain a mixture comprising organic-barium, organic-cadmium or organic-tin compounds; (b)

a sulfur-containing organic or organo-metallic compound having a boiling point at atmospheric pressure not below 200° C., and that does not contain chains of more than two consecutive sulfur atoms and in which at least one of the sulfur atoms has at least one lone electron pair, excepting mercapto-benzimidazole, mercapto-benzothiazole and their salts; and (c) an organic antioxidant capable of inhibiting chain reactions leading to degradation in the chlorine-containing homopolymer of copolymer. These compositions are complex mixtures requiring two extra components in addition to a normal heat stabilizer, and are frequently not homogeneous liquid compositions.

U.S. Patent No. 3,067,166 to Zaremsky, dated Dec. 4, 1962, discloses combinations of zinc or stannous or stannic tin salts of organic acids and mercapto-acid esters as synergistic heat stabilizers intended to have resistance to early discoloration.

British Patent No. 874,574 to Luz, published Aug. 10, 1961, describes stabilizer compositions composed of an organotin acid salt such as dibutyltin diacetate and thioglycolic acid ester, and British Patent No. 711,857 published Apr. 3, 1957, discloses combinations of mercapto acid esters with organotin compounds. These patents do not disclose organotin mercaptides nor mercapto acids, but only esters, and these are ineffective with organotin mercaptides.

Wooten et al., U.S. Patent No. 3,063,963, issued Nov. 13, 1962, disclose combinations of organotin salts of mono- or dicarboxylic acids in combination with omega-mercapto acids or omega-mercapto alcohols to improve resistance of polyvinyl chloride to UV radiation, weathering and heat. There is no suggestion that early discoloration is lessened with the combinations that are disclosed.

British Patent No. 991,763 discloses combinations of organotin compounds with a polythio polymercaptan, which may be a mercapto acid diester of an alkylene glycol or an oxyalkylene glycol. The patent does not disclose free alpha mercapto acids, only esters of omega-mercapto acids having from three to five carbon atoms. There is no indication that early color is improved by the combination; the data describes long term heat stability.

It has now been found that combinations of an organotin mercaptide and an alpha mercapto acid having at least three carbon atoms have the unusual property of lessening development of early discoloration of polyvinyl chloride resins, particularly during the first thirty minutes of heating at 350° F. The alpha mercapto acids are compatible with the organotin stabilizer so that these combinations form homogeneous liquids which can be readily measured and mixed into the polyvinyl chloride resin, and are thus easy to formulate, market and use.

In accordance with this invention there are provided stabilizer compositions for polyvinyl chloride resins comprising (a) at least one diorganotin mercaptide which has two alkyl and/or cycloalkyl groups linked to tin through carbon to two of the tin valences and from one to two hydrocarbon groups linked to tin through sulfur to the remaining two tin valences, wherein the hydrocarbon groups contain six to sixty carbon atoms, and (b) at least one alpha-mercapto carboxylic acid having from three up to about thirty carbon atoms.

The mercapto acid (b) alone imparts no stabilizing effect upon polyvinyl chloride resins but in combination with the organotin mercaptide lessens or entirely prevents development of early yellow discoloration during heating at 350° F. The mercapto acid may also reduce any initial cloudiness and discoloration in the resin introduced by the organotin mercaptide and/or other stabilizers and additives such as antioxidants, impact-modifiers and lubricants.

The organotin mercaptides can be monomeric or polymeric but are preferably monomeric. The monomers can be defined as diorganotin compounds having organic radicals linked to tin only through carbon and sulfur and having the general formula:

(I)

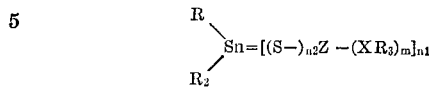

$Z_1$ is a hydrocarbon or heterocyclic group having from two to about thirty carbon atoms; these include aliphatic, aromatic, cycloaliphatic and heterocyclic groups. The $Z_1$ groups, if there are two mercapto groups attached to tin, may be the same or different.

$m$ is the number of $XR_3$ groups and is an integer from zero to about four. When $m$ is zero, $Z_1$ preferably contains at least ten carbon atoms.

$n_1$ and $n_2$ are one or two; the sum of $n_1$ and $n_2$ is three, i.e. when $n_1$ is one, $n_2$ is two, and when $n_1$ is two, $n_2$ is one.

$X$ is oxygen or sulfur.

$R_3$ is a hydrogen atom or a hydrocarbon radical or a heterocyclic radical having from one to about thirty carbon atoms. If there is more than one $XR_3$ group, the $R_3$ radicals can be the same or different.

The $XR_3$ group can be a mercapto, hydroxyl, thioether, ether, polythioether or polyether group.

When $n_2$ is 2 and $n_1$ is 1,

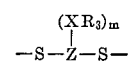

is a divalent group linked to tin through two sulfur atoms:

(II)

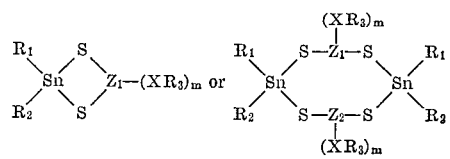

$R_1$ and $R_2$ are alkyl or cycloalkyl radicals having from three to six carbon atoms. $R_1$ and $R_2$ can, for example, be propyl, isopropyl, n-butyl, isobutyl, tert-butyl, n-amyl, iso-amyl, sec-butyl, t-amyl, hexyl, cyclopentyl, methylcyclopentyl, and cyclohexyl.

$Z_1$ can be alkyl, alkylene, aryl, arylene, aralkyl, alkaryl, cycloalkyl, and cycloalkylene groups, and the polyvalent equivalents thereof when $m$ is one or more, and monovalent and polyvalent aromatic heterocyclic and saturated heterocyclic groups. $Z_1$—$(XR_3)_m$ accordingly includes hexyl, 2-ethylbutyl, octyl, methylheptyl, isononyl, nonyl, decyl, undecyl, 2-ethyl hexyl, isooctyl, lauryl, palmityl, stearyl, myristyl, behenyl, tridecyl, cyclohexyl, methyl cyclohexyl, phenyl, tolyl, xylyl, benzyl, naphthyl, tetrahydronaphthyl, ethylphenyl, ethylthiobutyl, octylthioethyl, phenoxyethyl, ethoxyphenyl, hydroxyphenylthioxylyl mercaptooctyl, mercaptopropylthiopropyl, 2-hydroxyphenyl and 4-hydroxytolyl.

Polymeric organotin mercaptides falling within the present invention are formed of a linear or cyclic chain of orangotin groups wherein each tin atom is linked to two alkyl and/or cycloalkyl groups. There is at least one organic mercaptide group attached through a sulfur atom to each terminal tin atom in the chain. The linking group between tin atoms of the chain can be oxygen, sulfur or a polymercaptide group linked to tin through sulfur. Examples of oxygen-linked polymeric organotin compounds are set forth in U.S. Patent No. 2,809,956 to Mack et al., issued Oct. 15, 1957.

One type of such polymeric organotin mercaptide can be defined by the formula:

(III) 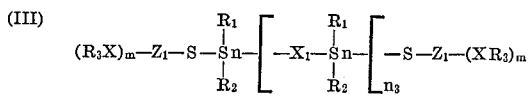

wherein $X_1$ is a divalent linking group such as oxygen, sulfur, or a polymercaptide group, and $n_3$ is a number from one to about twenty. The polymercaptide linking group has the formula —S—$Z_2$—S—, wherein $Z_2$ is a divalent hydrocarbon or heterocyclic organic group hav- from two to about thirty carbon atoms, such as the groups set out above for $Z_1$ and its polyvalent equivalents.

The diorganotin mercaptides useful in the present invention, where not known, can be readily prepared by the reaction of the corresponding mercaptans with diorganotin oxide or diorganotin chloride. For a more complete explanation of the process for making and for additional examples of the diorganotin mercaptides see U.S. Patent Nos. 2,726,227 and 2,726,254 both issued on Dec. 6, 1955 to Leistner et al. also No. 2,731,484 to Best, No. 2,801,258 to Johnson and No. 2,727,917 to Mack.

The diorganotin mercaptides containing two different mercaptide groups can be prepared by reacting the desired organotin oxide or chloride with a mixture of the mercaptides or by heating two different organotin mercaptides together.

The following organotin mercaptides are typical of those coming within the invention:

(1) $(C_6H_{13})_2$—Sn—(S—CH—$C_4H_9$)$_2$ with CH$_3$ (2) 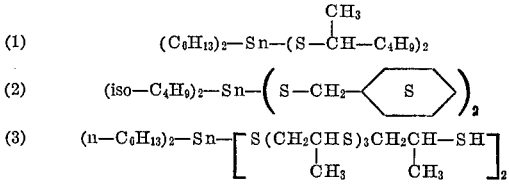

(3) 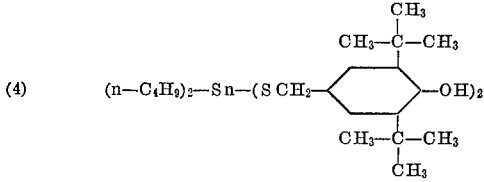

(4) 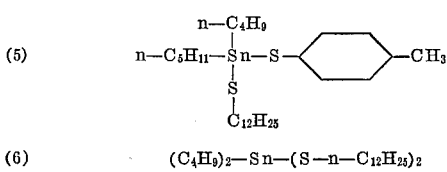

(5) $n$—$C_5H_{11}$—Sn—S—⟨⟩—CH$_3$ with $n$—$C_4H_9$ and S—$C_{12}H_{25}$ (6) $(C_4H_9)_2$—Sn—(S—$n$—$C_{12}H_{25})_2$ (7) (iso—$C_6H_{13})_2$—Sn—(S—$(CH_2)_2$—⟨⟩—$CH_3)_2$ (8) ($n$—$C_4H_9)_2$—Sn—(S—iso—$C_8H_{17})_2$ (9) 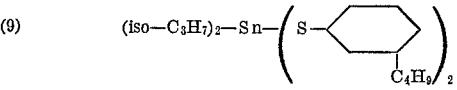

(10) iso—$C_6H_{13}$—S—Sn—S—Sn—S—iso—$C_6H_{13}$ with iso—$C_4H_9$ groups

(11) 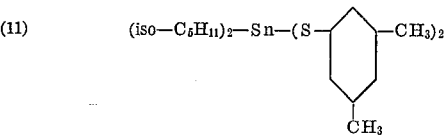

(12) $(CH_3$—C($CH_3)_2$—$CH_2)_2$—Sn—(S—⟨⟩—O$C_2H_5)_2$

(13) 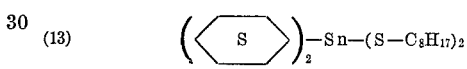

(14) 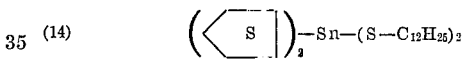

(15) HS—$C_8H_{16}$—S—[Sn—S—]$_3$—Sn—S—$C_8H_{16}$—SH with iso—$C_4H_9$ groups

(16) (iso—$C_4H_9)_2$—Sn with S—CH$_2$—CH$_2$—CH$_2$—S ring

(17) $C_8H_{17}$S—Sn—S—CH$_2$—⟨⟩—CH$_2$S—Sn—S $C_{12}H_{25}$ with $C_6H_{13}$ groups

(18) ($n$—$C_4H_9)_2$—Sn(SCH$_2$—⟨⟩—$C_{12}H_{25})_2$

(19) 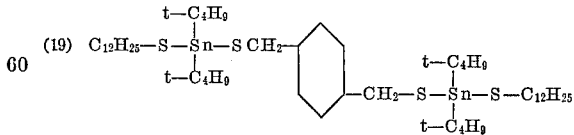

(20) 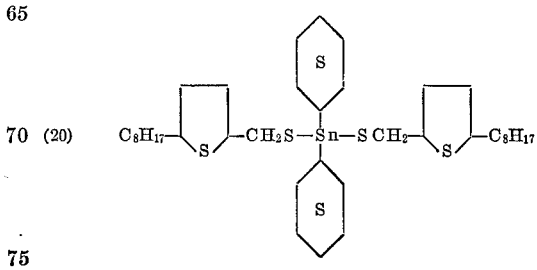

The second component is an alpha-mercapto acid having from three to thirty carbon atoms, and can be defined by the formula:

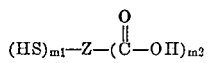

$$(HS)_{m_1}-Z-(\overset{O}{\underset{\|}{C}}-OH)_{m_2}$$

Z is a hydrocarbon group having from two to twenty-nine carbon atoms wherein one of each of the SH and COOH groups are attached to the same carbon atom, such as alkylidene, aralkylidene or cycloalkylidene, alkenylidene or cycloalkenylidene, which can have additional mercapto, hydroxy, carboxylic acid, ester, ether or thioether substituents. $m_1$ and $m_2$ are numbers from 1 to 4, preferably 1 or 2.

The alpha-mercapto monocarboxylic acids containing from three to six carbon atoms are preferred.

Examples of these alpha-mercapto acids include: 2-mercapto-2,3-dimethyl butyric acid, 2-mercaptopropionic acid, 2-mercaptobutyric acid, 2-mercapto - 4 - hydroxy butyric acid, 2-mercapto-3-methylbutyric acid, 2-mercapto-4,5-dimethylhexanoic acid, 2-mercaptostearic acid, 2-mercapto-oleic acid, 2-mercaptovaleric acid, 2-mercaptohexanoic acid, 2 - mercapto-6-hydroxyhexanoic acid, 2-mercapto-4-ethylhexanoic acid, thiomalic acid, thiocitric acid, dithiotartaric acid, 2-mercaptoglutaric acid, 2-mercapto-pimelic acid, 2-mercaptosuberic acid, 4-cyclohexyl-2-mercapto-butyric acid, 3-phenyl-2-mercapto propionic acid, 5-furyl-2-mercapto-hexanoic acid and 2-mercapto-lauric acid, and mixtures of these.

In addition to improving the effectiveness of the diorganotin mercaptide stabilizers, these mercapto acids are soluble in the liquid organotin mercaptides and thus form homogeneous solutions. Such single package liquid stabilizers can be readily measured and blended into a resin mixture by the resin processor.

In this respect, the alpha-mercapto acids of the instant invention differ from thioglycolic acid, which is incompatible with the diorganotin mercaptides of this invention, and causes precipitation, forming a nonhomogeneous mixture. Such a nonhomogeneous liquid-solid stabilizer mixture increases the problems of measuring and mixing the stabilizer into the resin, and practically speaking is unmarketable commercially, because of its unattractive appearance and variable concentration.

The invention is applicable to any polyvinyl chloride resin. The term "polyvinyl chloride" as used herein is inclusive of any polymer formed at least in part of the recurring group.

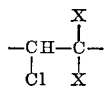

$$-CH-\underset{\underset{X}{|}}{\overset{\overset{X}{|}}{C}}-$$
$$\phantom{-CH-}\underset{Cl}{|}$$

and having a chlorine content in excess of 40%. In this group, the X groups can each be either hydrogen or chlorine. In polyvinyl chloride homopolymers, each of the X groups is hydrogen. Thus, the term includes not only polyvinyl chloride homopolymers but also after-chlorinated polyvinyl chlorides such as those disclosed in British Patent No. 893,288 and also copolymers of vinyl chloride in a major proportion and other copolymerizable monomers in a minor proportion, such as copolymers of vinyl chloride and vinyl acetate, copolymers of vinyl chloride with maleic or fumaric acids or esters, and copolymers of vinyl chloride with styrene, propylene, and ethylene. The invention also is applicable to mixtures of polyvinyl chloride in a major proportion with other synthetic resins such as chlorinated polyethylene or a copolymer of acrylonitrile, butadiene and styrene. Among the polyvinyl chlorides which can be stabilized are uniaxially stretch-oriented polyvinyl chlorides described in U.S. Patent No. 2,984,593 to Isaksem et al., that is syndiotactic polyvinyl chloride, as well as atactic and isotactic polyvinyl chlorides.

The stabilizing combinations of this invention, both with and without supplementary stabilizers, are excellent stabilizers for both plasticized and unplasticized polyvinyl chloride resins. When plasticizers are to be employed, they may be incorporated into the polyvinyl chloride resins in accordance with conventional means. The conventional plasticizers can be used, such as dioctyl phthalate, dioctyl sebacate and tricresyl phosphate. Where a plasticizer is employed, it can be used in an amount within the range from 0 to 100 parts by weight of the resin.

Particularly useful plasticizers are the epoxy higher esters having from about twenty to about one hundred fifty carbon atoms. Such esters will initially have had unsaturation in the alcohol or acid portion of the molecule, which is taken up by the formation of the epoxy group.

Typical unsaturated acids are oleic, linoleic, linolenic, erucic, ricinoleic and brassidic acids, and these may be esterified with organic monohydric or polyhydric alcohols, the total number of carbon atoms of the acid and the alcohol being within the range stated. Typical monohydric alcohols include butyl alcohol, 2-ethylhexyl alcohol, lauryl alcohol, isooctyl alcohol, stearyl alcohol, and oleyl alcohol. The octyl alcohols are preferred. Typical polyhydric alcohols include pentaerythritol, glycerol, ethylene glycol, 1,2-propylene glycol, 1,4-butylene glycol, neopentyl glycol, ricineleyl alcohol, erythritol, mannitol and sorbitol. Glycerol is preferred. These alcohols may be fully or partially esterified with the epoxidized acid. Also useful are the epoxidized mixtures of higher fatty acid esters found in naturally-occurring oils such as epoxidized soybean oil, epoxidized olive oil, epoxidized cottonseed oil, epoxidized tall oil fatty acid esters, epoxidized coconut oil and epoxidized tallow. Of these, epoxidized soybean oil is preferred.

The alcohol can contain the epoxy group and have a long or short chain, and the acid can have a short or long chain, such as epoxy stearyl acetate, epoxy stearyl stearate, glycidyl stearate, and polymerized glycidyl methacrylate.

A small amount, usually not more than 1.5%, of a parting agent or lubricant, also can be included. Typical parting agents are the higher aliphatic acids, and salts having twelve to twenty-four carbon atoms, such as stearic acid, lauric acid, palmitic acid and myristic acid, lithium stearate and calcium palmitate, mineral lubricating oils, polyvinyl stearate, polyethylene and paraffin wax.

Impact modifiers, for improving the toughness or impact-resistance of unplasticized resins, can also be added to the resin compositions stabilized by the present invention in minor amounts of usually not more than 10%. Examples of such impact modifiers include chlorinated polyethylene, ABS polymers, and polyacrylate-butadiene graft copolymers.

The stabilizer components of the invention including the organotin mercaptide and mercapto acid, are employed in an amount sufficient to impart the desired resistance to heat deterioration at working temperatures of 350° F. and above. The more rigorous the conditions to which the resin will be subjected during working and mixing, and the longer the term required for resisting degradation, the greater will be the amount of organotin mercaptide required. Generally, as little as 0.25% total of the stabilizer components by weight of the resin, will give resistance to heat deterioration.

There is no critical upper limit on the amount, but amounts above about 10% by weight of the resin do not give an increase in stabilizing effectiveness commensurate with the additional stabilizer employed. Preferably, the amount is from about 0.25 to about 5% by weight of the resin.

The mercapto acid is not itself a stabilizer, and when used alone is ineffectual. Consequently, it is remarkable that as little as 0.1% of the mercapto acid by weight of the organotin mercaptide markedly improves resistance to early discoloration. Preferably, for optimum results, the amount of the mercapto acid is from about 0.25% to about 5% by weight of the organotin mercaptide. The proportion of mercapto acid can be higher, but in amounts above 15% any additional advantage may not be commensurate with the amount added.

The mercapto acid also improves clarity, particularly when cloudiness-imparting additives are present, such as lubricants and impact modifiers. In this event, more of the mercapto acid may be needed.

The stabilizer combination of the invention can be employed together with other polyvinyl chloride resin stabilizers. The stabilizer combination of the invention in this event will be the major stabilizer, and the additional stabilizer will supplement the stabilizing action of the former; the amount of the stabilizer combination being within the range from about 0.25 to about 15 parts by weight per 100 parts of the resin, and preferably 0.5 to 5, and the additional stabilizer being in an amount of from about 0.05 to about 10 parts per 100 parts of the resin.

Among the additional metallic stabilizers are included other organotin compounds and polyvalent metal salts of carboxylic acids, monoesters of dicarboxylic acids, phenols and mercaptans with metals such as calcium, tin, cadmium, barium, zinc, magnesium and strontium. The non-metallic stabilizers include phenolic antioxidants, sulfides, phosphites, epoxy compounds, polyhydric alcohols, and the like.

Generally, the stabilizer composition of this invention can be prepared by mixing the organotin mercaptide with the mercapto acid, either alone, or with any liquid lubricant or plasticizer to be added to the resin composition with stabilizer.

The preparation of the polyvinyl chloride resin composition is easily accomplished by conventional procedures. The selected stabilizer combination is formed as above, and then is blended with the polyvinyl chloride resin, or alternatively, the components are blended individually with the resin, on a two- or three-roll mill, at a temperature at which the mix is fluid and thorough blending facilitated, milling the resin composition including any plasticizer at from 230 to 375° F. for a time sufficient to form a homogeneous mass, five minutes, usually. After the mass is uniform, it is sheeted off in the usual way.

The following examples in the opinion of the inventor represent preferred embodiments of this invention.

EXAMPLES 1 AND 2

A series of formulations was prepared having the following composition:

| Ingredients: | Parts by weight |
|---|---|
| Polyvinyl chloride homopolymer (Diamond 450) | 150 |
| Mineral oil (lubricant) | 1.5 |
| Dibutyltin di(lauryl mercaptide); alpha-mercapto acid noted in Table I | 3.0 |

The stabilizer components were first mixed together at 150° F. for one half hour in the proportions indicated, which formed a homogeneous liquid solution, stable on cooling which was then mixed with the resin and fused on a two-roll mill, and sheeted off. The sheets were cut into approximately ½" x ¾" chips and tested in an oven at 375° F. and at 350° F. Pieces of each strip were removed at 15 minute intervals and affixed to cards to show the progressive heat deterioration.

In all cases, the resins containing only mercapto acids and no organotin mercaptide, turned a dark ochre on the mill, and were therefore not subjected to the heat stability test. The results of the tests of the remaining samples are reported in Tables I and IA.

TABLE I
(375° F.)

| | Control A | Amount | Control B | Amount | Control C | Amount | Example 1 | Amount 1 | Example 2 | Amount 2 | Example | Amount |
|---|---|---|---|---|---|---|---|---|---|---|---|---|
| Stabilizer Composition | Dibutyltin di(lauryl mercaptide) | 3.0 | Dibutyltin di(lauryl mercaptide), 4-mercaptobutyric acid | | Dibutyltin di(lauryl mercaptide), Isooctyl thioglycolate | 2.94 / 0.06 | Dibutyltin di(lauryl mercaptide), Thiolactic acid | 2.88 / 0.12 | Dibutyltin di(lauryl mercaptide), Alpha-mercapto lauric acid | 2.94 / 0.06 | Dibutyltin di(lauryl mercaptide), Alpha-mercapto lauric acid | 2.91 / 0.09 |
| | Color | | Color | | Color | | Color | | Color | | Color | |
| Time (minutes): | | | | | | | | | | | | |
| Initial | Colorless, slight haze | | Colorless, slight haze | | Colorless, slight haze | | Clear, colorless | | Clear, colorless | | Clear, colorless | |
| 15 | Yellow | | Yellow | | Yellow | | Very light yellow | | Very light yellow | | Very light yellow | |
| 30 | do | | do | | do | | do | | do | | Do | |
| 45 | do | | do | | do | | do | | do | | Do | |
| 60 | Yellow with darkened borders | | Yellow with darkened borders | | Yellow with darkened borders | | Light yellow slightly darkened edges | | Light yellow slightly darkened edges | | Light yellow with slightly darkened edges | |
| 75 | Dark orange with brown border | | Dark orange with black borders | | Very dark orange darker borders | | Dark orange with darker edges | | Dark orange with darker edges | | Very dark orange | |
| 90 | Very dark brown | | Black | | Very deep red | | Brown | | Brown | | Do | |
| 105 | | | | | Black | | Dark brown | | Dark brown | | Black | |
| 120 | | | | | | | | | | | | |

TABLE IA
(350° F.)

| | Control A | Amount | Control B | Amount | Example 1 | Amount | 2 | Amount |
|---|---|---|---|---|---|---|---|---|
| Stabilizer Composition | Dibutyltin di(lauryl mercaptide). | 3.0 | Dibutyltin di-(lauryl mercaptide). 4-mercaptobutyric acid. | 2.94 0.06 | Dibutyltin di-(lauryl mercaptide). Thiolactic acid | 2.94 0.06 | Dibutyltin di-(lauryl mercaptide). Alpha-mercapto lauric acid. | 2.91 0.09 |
| | Color | | Color | | Color | | Color | |
| Time (minutes): | | | | | | | | |
| Initial | Colorless | | Colorless | | Colorless | | Colorless. | |
| 15 | Light yellow | | Light yellow | | do | | Do. | |
| 30 | do | | do | | do | | Do. | |
| 45 | do | | do | | Very pale yellow | | Pale yellow. | |
| 60 | do | | do | | do | | Light yellow. | |
| 75 | do | | do | | Pale yellow | | Do. | |
| 90 | do | | do | | do | | Do. | |
| 105 | do | | do | | Light yellow | | Do. | |
| 120 | Yellow | | do | | do | | Do. | |

The results clearly indicate that the alpha-mercapto acids greatly improve the resistance to early discoloration at 375° F. and at 350° F. of polyvinyl chloride resins containing an organotin mercaptide, i.e. dibutyltin di-(lauryl mercaptide) as a heat stabilizer. In contrast, mercapto acids other than alpha-mercapto acids, such as 4-mercaptobutyric acid in Control B and mercapto acid esters such as isooctyl thioglycolate in Control C are ineffective in reducing this early discoloration. Thus, the presence of a free carbon group and the relative position of the mercapto group to the free carboxylic acid group in the molecule determines the effectiveness of the mercapto acid in preventing early discoloration when combined with a diorganotin mercaptide heat stabilizer.

The difference between yellow and very light yellow during the first thirty minutes of heating at 375° F. and between colorless and light yellow at 350° F. is quite significant, since the plastic material, during actual manufacture, which remains in the processing equipment longer than this period is small, relative to the entire batch, and a very small difference in color intensity in the first thirty minutes can be more crucial in determining the appearance of the product regardless of the discoloration of this residual material. The samples of Example 1 and Example 2 being lighter after 45 minutes than any of Controls A, B or C after 15 minutes show a greater than threefold improvement in heat stability by the composition according to this invention.

EXAMPLES 3 AND 4

A series of resin formulations were prepared having the following compositions:

Composition: Parts by weight
Polyvinyl chloride homopolymer _____ 150
Mineral oil (lubricant) _____ 0.75
Stabilizer _____ As shown in table The stabilizer components were first mixed as described in Example 1 and then blended with the resin on a two-roll mill at 300° F. for five minutes and sheeted off. Chips were cut from the sheets as in Example 1 and subjected to oven ageing at 350° F and 375° F. The results of this test are shown in Tables II and III.

TABLE II
(375° F.)

| | Control D | Amount | Example 3 | Amount | Control E | Amount | 4 | Amount |
|---|---|---|---|---|---|---|---|---|
| Stabilizer Composition | Dibutyltin di(lauryl mercaptide). | 4.5 | Dibutyltin di-lauryl( mercaptide). Thiolactic acid | 4.1 0.4 | Dibutyltin di-(dodecyl benzyl mercaptide). | 4.5 | Dibutyltin di-(dodecyl benzyl mercaptide). Thiolactic acid | 4.4 0.1 |
| | Color | | Color | | Color | | Color | |
| Time (minutes): | | | | | | | | |
| Initial | Colorless | | Colorless | | Very pale yellow | | Colorless. | |
| 15 | Yellow | | do | | Yellow | | Do. | |
| 30 | do | | do | | do | | Do. | |
| 45 | do | | Very pale yellow | | do | | Very pale yellow. | |
| 60 | Yellow with red corners | | Light yellow | | do | | Do. | |
| 75 | do | | Yellow | | Yellow-red edges | | Yellow-red edges. | |
| 90 | Yellow with red edges | | do | | Yellow-brown edges | | Yellow-brown edges. | |
| 105 | Light amber | | Brown | | Brown | | Brown. | |
| 120 | Dark brown | | Dark brown | | Dark brown | | Dark brown. | |

TABLE III
(350° F.)

| | Control D | Amount | Example 3 | Amount | Control E | Amount | 4 | Amount |
|---|---|---|---|---|---|---|---|---|
| Stabilizer Composition | Dibutyltin di(lauryl mercaptide). | 4.5 | Dibutyltin di-(lauryl mercaptide). Thiolactic acid | 4.1 0.4 | Dibutyltin di-(dodecyl benzyl mercaptide). | 4.5 | Didutyltin di-(dodecyl benzyl mercaptide). Thiolactic acid | 4.4 0.1 |
| | Color | | Color | | Color | | Color | |
| Time (minutes): | | | | | | | | |
| Initial | Colorless | | Colorless | | Very pale yellow | | Colorless. | |
| 15 | Yellow | | do | | Pale yellow | | Do. | |
| 30 | do | | do | | do | | Do. | |
| 45 | do | | do | | do | | Do. | |
| 60 | do | | do | | do | | Very pale yellow. | |
| 75 | do | | do | | do | | Do. | |
| 90 | do | | Very pale yellow | | do | | Do. | |
| 105 | do | | do | | do | | Do. | |
| 120 | do | | do | | do | | Do. | |

Examples 3 and 4 demonstrate that the alpha-mercapto acids (thiolactic acid) improve the resistance to early discoloration of polyvinyl chloride resins when heated at both 350° F. and at 375° F. in the presence of a diorganotin mercaptide heat stabilizer. Examples 3 and 4, containing the combination of this invention, remained colorless or showed only the palest yellow tint even after 45 minutes of heating, at 375° F. while Control D and Control E were yellow after only 15 minutes, again a more than three-fold improvement in resistance to discoloration.

EXAMPLES 5 AND 6

Four polyvinyl chloride compositions were prepared having the same base formula as Example 4. The formulations were tested at 350° F. following the method of Example 4 and the results are tabulated in Table IV.

EXAMPLE 8

A polyvinyl chloride copolymer resin composition was prepared having the following formulation:

| Composition: | Parts by weight |
|---|---|
| Polyvinyl chloride copolymer (15% vinyl acetate) | 100 |
| Stearic acid | 0.5 |
| Dibutyltin di(octyl mercaptide) | 2.5 |
| Thiolactic acid | 0.1 |

The composition was mixed and tested as in Example 2, tested at 375° F. The samples showed very good early color with long term stability.

EXAMPLE 9

An impact modified polyvinyl chloride resin composition was prepared having the following formulation:

TABLE IV
(350° F.)

| | Control F | Amount | Example 5 | Amount | Control G | Amount | Example 6 | Amount |
|---|---|---|---|---|---|---|---|---|
| Stabilizer Composition | Dibutyltin bis-(4-t-butyl thiophenate). | 4.5 | Dibutyltin bis-(4-t-butyl thiophenate).<br>Thiolactic acid | 4.4<br><br>0.1 | Dibutyltin di-(tridecyl mercaptide). | 4.5 | Dibutyltin di-(tridecyl mercaptide).<br>Thiolactic acid | 4.4<br><br>0.1 |
| | Color | | Color | | Color | | Color | |
| Time (minutes): | | | | | | | | |
| Initial | Very pale yellow | | Colorless | | Very pale yellow | | Colorless. | |
| 15 | Yellow | | do | | Yellow | | Do. | |
| 30 | do | | Very pale yellow | | do | | Very pale yellow. | |
| 45 | do | | Pale yellow | | do | | Do. | |
| 60 | do | | do | | do | | Pale yellow. | |
| 75 | do | | do | | do | | Do. | |
| 90 | do | | do | | Pale yellow | | Do. | |
| 105 | do | | do | | do | | Do. | |
| 120 | do | | do | | do | | Do. | |

Examples 5 and 6 demonstrate that alpha-mercapto acids (thiolactic acids) are effective in preventing early yellow discoloration of polyvinyl chloride when heated at 350° F. with several different diorganotin mercaptide heat stabilizers.

A further stabilizer composition was prepared by heating a mixture of 1.0 g. thioglycolic acid and 99.0 g. dibutyltin di(lauryl mercaptide) at 150° F. for one half hour. This composition was not homogeneous, and a solid material separated out as a precipitate on cooling to room temperature. This of course was what would be expected from U.S. Patent No. 2,789,963, Example 1. Similarly, a blend was prepared of 99.0 g. dibutyltin di(lauryl mercaptide) and 1.0 g. beta-mercaptopropionic acid. This also formed a nonhomogeneous mixture containing substantial amounts of precipitate.

Accordingly, an unexpected result has been demonstrated when the alpha-mercapto acids of the instant invention are combined with organotin mercaptide stabilizers, and in this respect the alpha mercapto acids differ from the other related mercapto acids and esters, as for example the gamma-mercapto acids and esters as well as the alpha-mercapto acid esters.

EXAMPLE 7

A plasticized resin composition was prepared having the following formulation:

| Composition: | Parts by weight |
|---|---|
| Polyvinyl chloride homopolymer | 100 |
| Dioctyl phthalate | 50 |
| Dibutyltin di(lauryl mercaptide) | 2.94 |
| Thiolactic acid | 0.06 |

The composition was mixed as in Example 2, sheeted off and tested in an air oven at 350° F. The sample showed excellent early color and good long term stability.

| Composition: | Parts by weight |
|---|---|
| Polyvinyl chloride homopolymer | 100 |
| ABS impact modifier (Blendex 401) | 10 |
| Trimeric dibutyltin ethylene dimercaptide terminated by dodecyl mercaptide groups | 1.5 |
| Thiolactic acid | 0.1 |

The sample was mixed as in Example 2 and tested at 350° F. The sample showed good early color with long term stability.

EXAMPLE 10

A polyvinyl chloride resin composition was prepared having the following formulation:

| Composition: | Parts by weight |
|---|---|
| Polyvinyl chloride homopolymer | 100 |
| Isooctyl epoxy stearate | 3.0 |
| Dibutyltin di(lauryl mercaptide) | 2.0 |
| Alpha-mercapto lauric acid | 0.1 |

The resin was mixed and tested as in Example 2, i.e. tested at 375° F. The sample showed very good early color with long term heat stability.

Having regard to the foregoing disclosure, the following is claimed as the inventive and patentable embodiments thereof:

1. A homogeneous liquid stabilizer composition for lessening early discoloration of polyvinyl chloride resins when heated at 350° F. comprising (a) at least one diorganotin mercaptide containing two radicals per tin atom selected from the group consisting of alkyl and cycloalkyl groups having three to about six carbon atoms linked to two valences of tin through carbon and from one to two organic groups selected from the group consisting of hydrocarbon and heterocyclic groups, linked to the terminal valences of tin through two mercapto sulfur atoms and having from six to about sixty carbon atoms and (b) an alpha-mercapto carboxylic acid having from three to about thirty carbon atoms and having the formula:

$$(HS)_{m_1}-Z-(\overset{O}{\underset{\|}{C}}-OH)_{m_2}$$

wherein Z is a hydrocarbon group or an inertly substituted hydrocarbon group and $m_1$ and $m_2$ are each numbers from one to four, at least one SH-group and one $$-\overset{O}{\underset{\|}{C}}OH\text{-group}$$

are attached to Z in the alpha position to each other, the alpha-mercapto acid being present in an amount of from 0.1% to about 15% by weight of the organotin mercaptide.

2. A stabilizer composition according to claim 1 werein the organotin mercaptide has the formula (I) $$\underset{R_2}{\overset{R_1}{\diagdown}}Sn=[(S)_{n_2}-Z_1-(XR_3)_m]_{n_1}$$

wherein $R_1$ and $R_2$ are alkyl or cycloalkyl groups having from three to about six carbon atoms, $Z_1$ is an organic group selected from the group consisting of hydrocarbon and heterocyclic radicals having from two to about thirty carbon atoms, $R_3$ is selected from the group consisting of hydrogen and organic hydrocarbon and heterocyclic radicals having from one to about thirty carbon atoms, X is selected from the group consisting of oxygen and sulfur, $n_1$ and $n_2$ are integers from one to two, the sum of $n_1$ and $n_2$ being three, and $m$ is an integer from zero to about four.

3. The stabilizer composition of claim 2 wherein the group ($XR_3$) is selected from the group consisting of mercapto, hydroxyl, monothioether, monoether, polythioether and polyether groups.

4. The stabilizer composition of claim 2 wherein $m$ is zero.

5. The stabilizer composition of claim 1 wherein the mercapto acid is thiolactic acid.

6. The stabilizer composition of claim 4 wherein the mercapto acid is alpha-mercapto lauric acid.

7. The stabilizer composition of claim 1 wherein the mercapto compound is present in an amount of from 0.25 to about 5% by weight of the organotin mercaptide.

8. A stabilizer composition according to claim 1 wherein the organotin mercaptide is a dibutyltin aliphatic mercaptide.

9. A stabilizer composition according to claim 1 wherein the organotin mercaptide is dibutyltin dilauryl mercaptide.

10. A polyvinyl chloride resin composition having an enhanced resistance to early discoloration when heated at 350° F., comprising a polyvinyl chloride resin, (a) at least one diorganotin mercaptide containing two radicals per tin atom selected from the group consisting of alkyl and cyclalkyl groups having from three to about six carbon atoms linked to two valences of tin through carbon and from one to two organic groups selected from the groups consisting of hydrocarbon and heterocyclic groups, linked to the remaining two valences of tin through two mercapto sulfur atoms and having from six to about sixty carbon atoms, and (b) an alpha-mercapto carboxylic acid having from three to about thirty carbon atoms and having the formula $$(HS)_{m_1}-Z-(\overset{O}{\underset{\|}{C}}-OH)_{m_2}$$

wherein Z is a hydrocarbon group of an inertly substituted hydrocarbon group and $m_1$ and $m_2$ are each numbers of from one to four, at least one SH- group and one $$-\overset{O}{\underset{\|}{C}}-OH$$

are attached to Z in the alpha position to each other, the organotin mercaptide and mercapto acid together being present in an amount of from 0.25 to about 10% by weight of the resin.

11. A polyvinyl chloride resin composition according to claim 10 wherein the organotin mercaptide has the formula $$\underset{R_2}{\overset{R_1}{\diagdown}}Sn=[(S)_{n_2}-Z_1-(XR_3)_m]_{n_1}$$

wherein $R_1$ and $R_2$ are alkyl or cycloalkyl groups having from three to about six carbon atoms, $Z_1$ is an organic group selected from the group consisting of hydrocarbon and heterocyclic radicals having from two to about thirty carbon atoms, $R_3$ is selected from the group consisting of hydrogen and organic hydrocarbon and heterocyclic radicals having from one to thirty carbon atoms, X is selected from the group consisting of oxygen and sulfur, $n_1$ and $n_2$ are integers from one to two, the sum of $n_1$ and $n_2$ being three, and $m$ is an integer from zero to about four.

12. A polyvinyl chloride resin composition according to claim 11 wherein $m$ is zero.

13. A polyvinyl chloride resin composition according to claim 10 wherein the mercapto acid is thiolactic acid.

14. A polyvinyl chloride resin composition according to claim 10 wherein the mercapto acid is alpha-mercapto lauric acid.

15. A polyvinyl chloride resin compositon according to claim 10 wherein the organotin mercaptide is a dibutyltin aliphatic mercaptide.

16. A stabilizer composition according to claim 1 wherein the organotin mercaptide has the formula $$(R_3X)_{m_3}-Z_1-S-\underset{R_2}{\overset{R_1}{\underset{|}{\overset{|}{Sn}}}}-\left[-X_1-\underset{R_2}{\overset{R_1}{\underset{|}{\overset{|}{S}}}}-\right]_{n_3}-S-Z_1-(XR_3)_{m_4}$$

wherein $R_1$ and $R_2$ are alkyl or cycloalkyl groups, $X_1$ is a divalent linking group selected from the group consisting of oxygen, sulfur, and polymercaptide groups, $n_3$ is a number from one to about twenty, $Z_1$ is a hydrocarbon or heterocyclic group having from two to about thirty carbon atoms, $m_3$ and $m_4$ are zero or a number from one to about four, $R_3$ is hydrogen or a heterocyclic or hydrocarbon group having from one to about thirty carbon atoms, and X is oxygen or sulfur.

References Cited

UNITED STATES PATENTS

| 2,789,963 | 4/1957 | Hecker | 260—45.75 |
|---|---|---|---|
| 2,809,956 | 10/1957 | Mack | 260—45.75 |
| 2,891,922 | 6/1959 | Johnson | 260—31.8 |
| 3,063,963 | 11/1962 | Wooten | 260—45.75 |
| 3,398,114 | 8/1968 | Pollock | 260—45.75 |
| 3,410,884 | 11/1968 | Mack | 260—429.7 |

DONALD E. CZAJA, Primary Examiner

V. P. HOKE, Assistant Examiner

U.S. Cl. X.R.

252—400; 260—45.7, 45.8, 45.9, 45.85, 45.95

PO-1050
(5/69)

UNITED STATES PATENT OFFICE
CERTIFICATE OF CORRECTION

Patent No. __3,503,924__  Dated __March 31, 1970__

Inventor(s) __Mark W. Pollock__

It is certified that error appears in the above-identified patent and that said Letters Patent are hereby corrected as shown below:

In Column 4, line 5, "Z" should be $Z_1$

In Column 4, line 45, "$Z_2$" should be $Z_1$

In Column 5, line 10, III, "[" should be --]--;

In Column 5, line 28, "process" should be --processes--;

In Column 10, Table I under Control A, 14th line, "yeollw" should be --yellow--;

In Column 10, Table I, under Control B, 17th line, "wirh" should be --with--;

In Column 10, Table I, under Amount 2, 17th line, "orznge" should be --orange--;

In Column 13, under Examples 5 & 6, line 14 "formula" should be --formulations-

In Column 13, under Examples 5 & 6, line 39, "acids" should be --acid--(second occurance)

In Column 13, under Examples 5 & 6, line 58, "the" should be deleted.

In Column 8, line 30, "ricineleyl" should be --ricinoleyl--;

In Column 5, line 14, " [ " should be ]

Signed and sealed this 8th day of September 1970.

(SEAL)
Attest:

EDWARD M. FLETCHER, JR.  
Attesting Officer

WILLIAM E. SCHUYLER, JR.  
Commissioner of Patents